C. H. MERCER & C. H. WOEHLE.
BASCULE BRIDGE.
APPLICATION FILED NOV. 15, 1915.
1,241,237.
Patented Sept. 25, 1917.
6 SHEETS—SHEET 6.
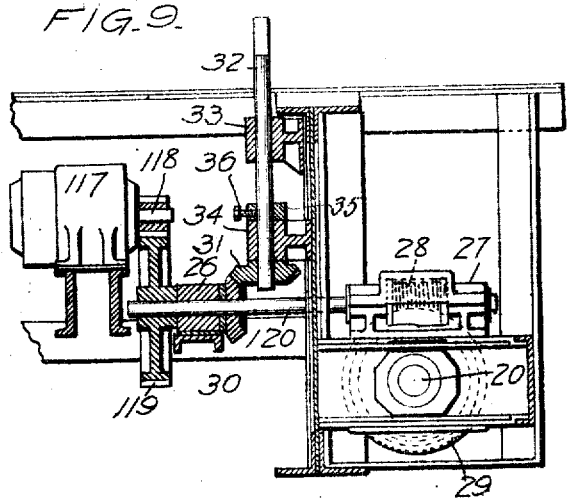
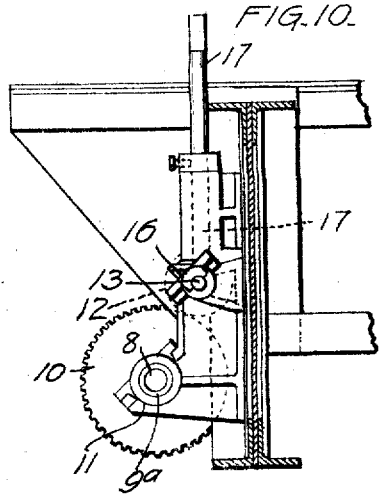
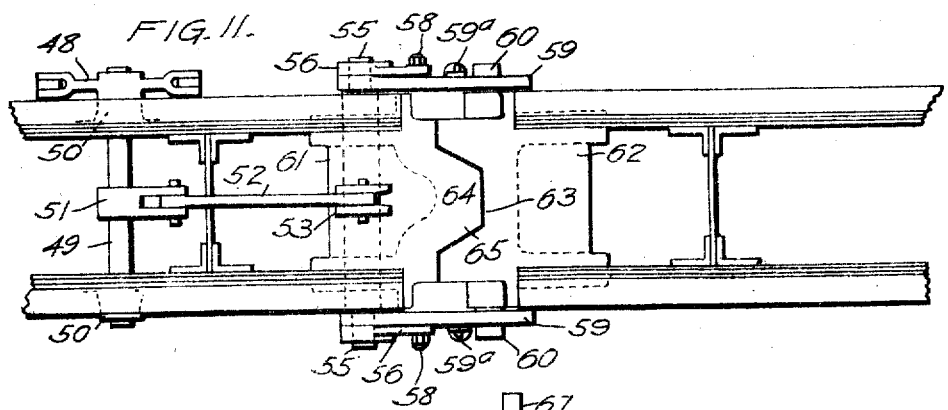
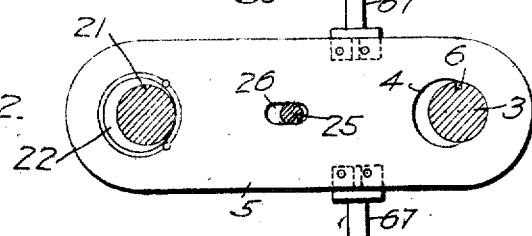
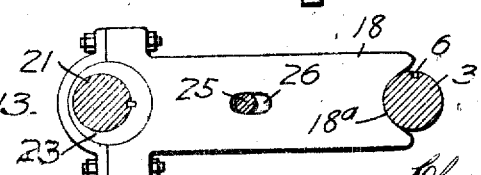
Witnesses
Inventors
Charles H. Mercer and
Charles H. Woehle
By
Attorney

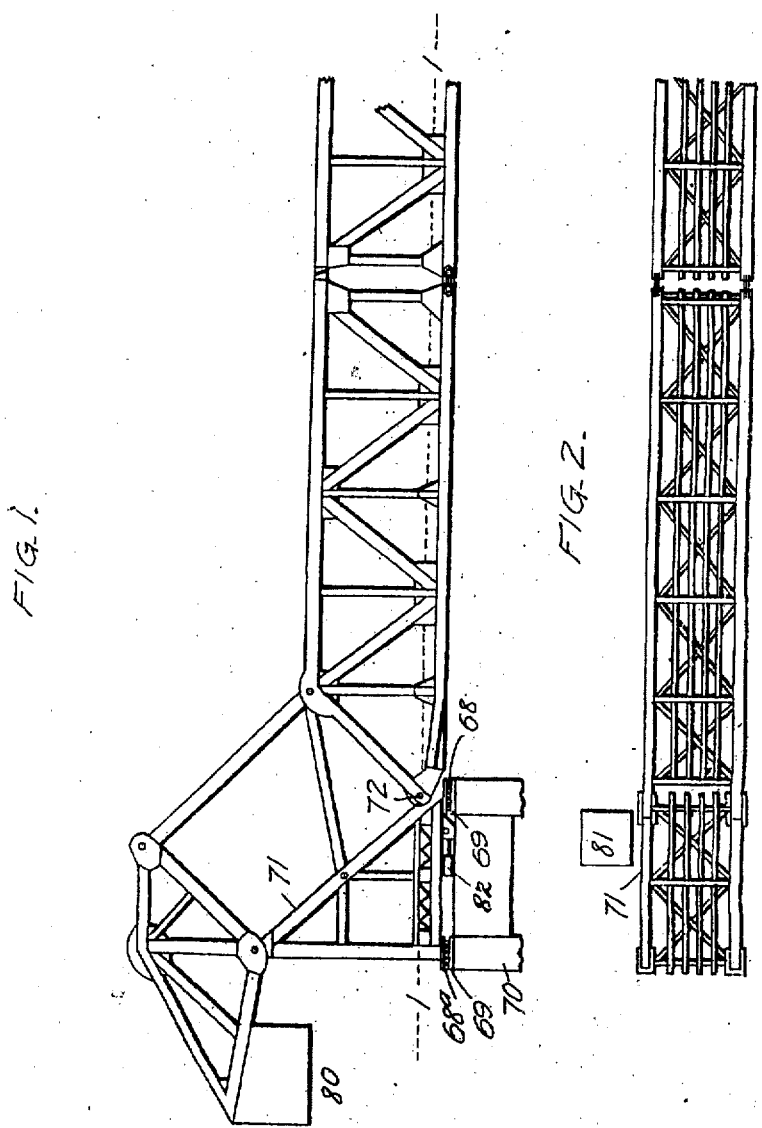

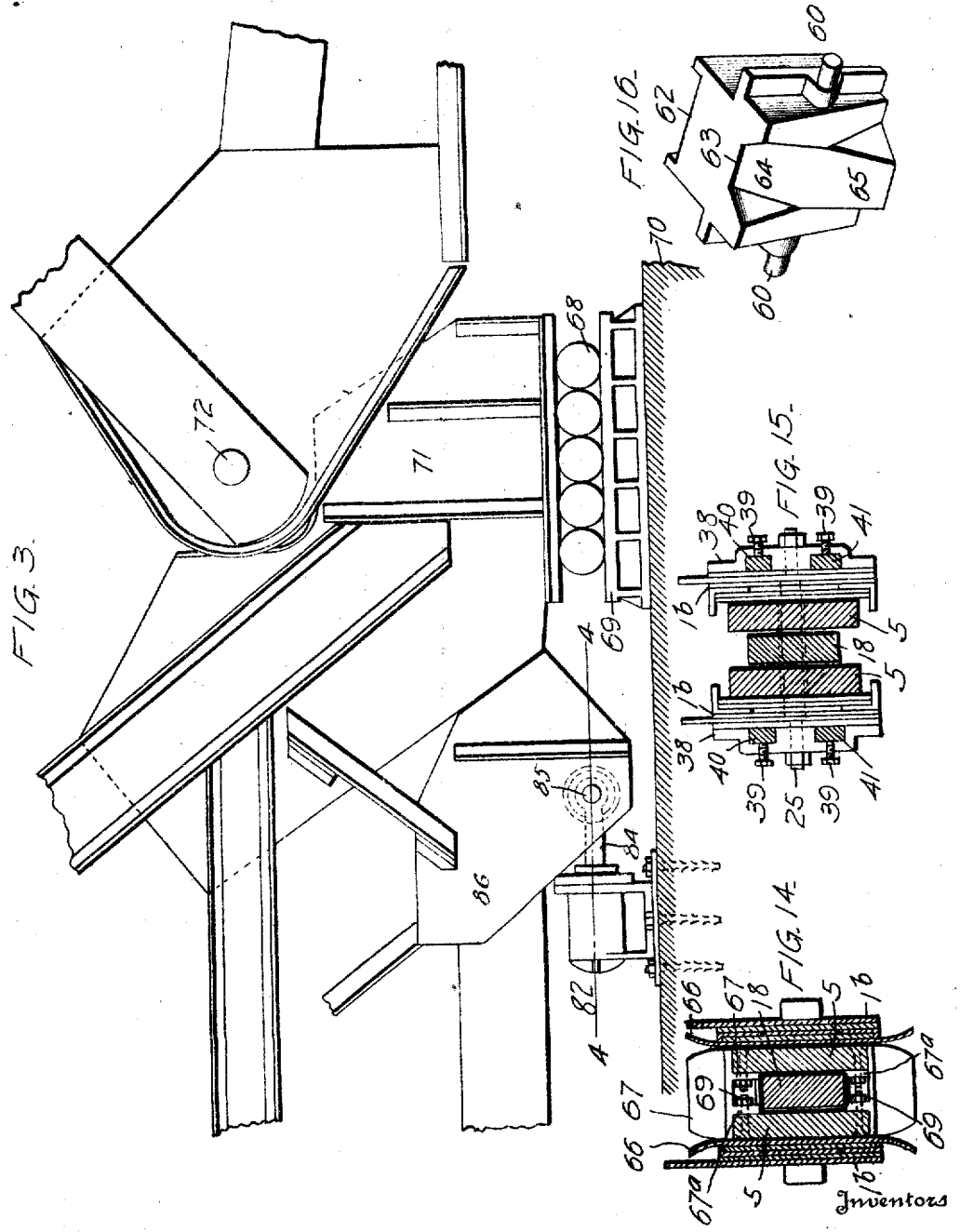

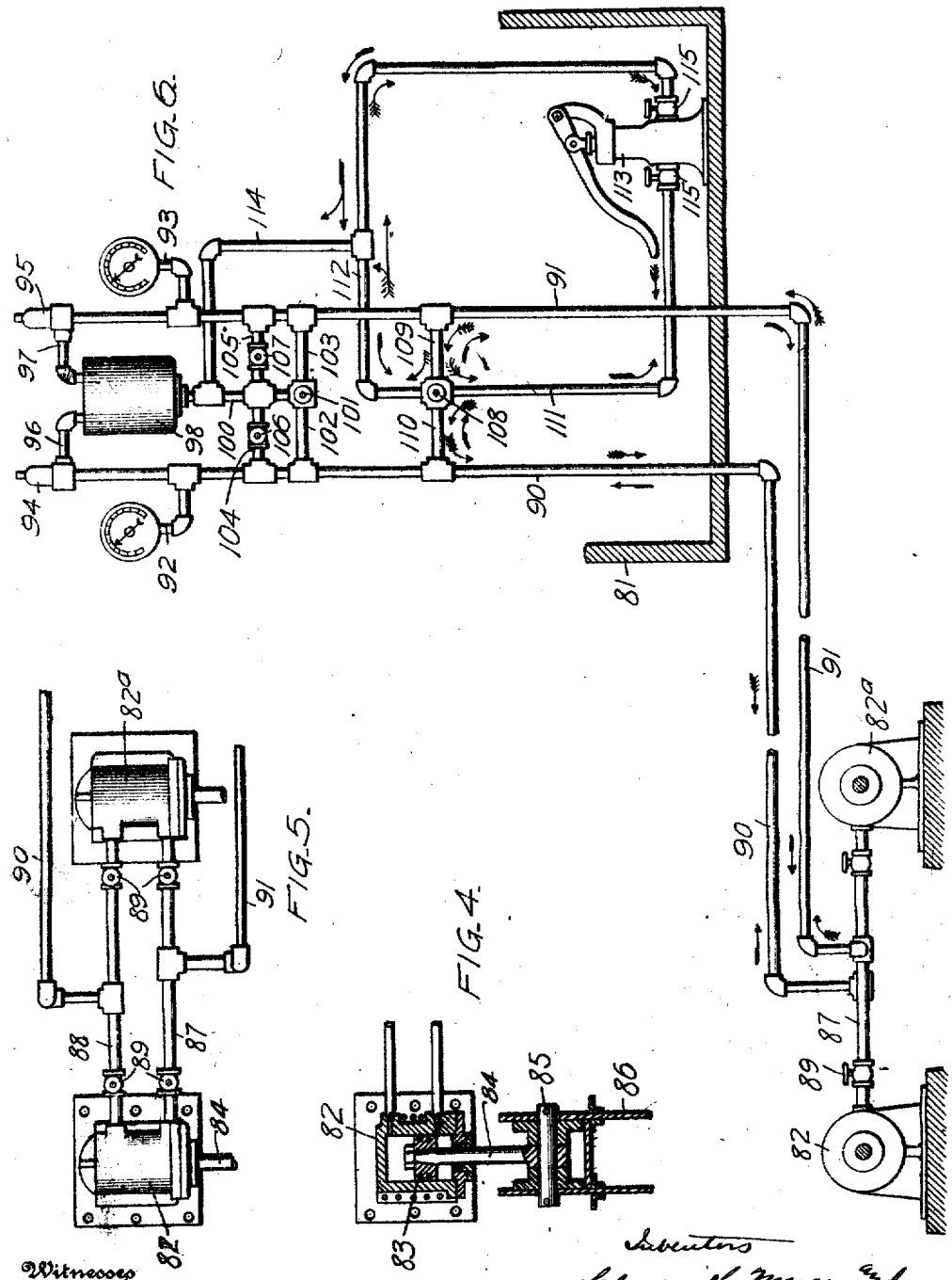

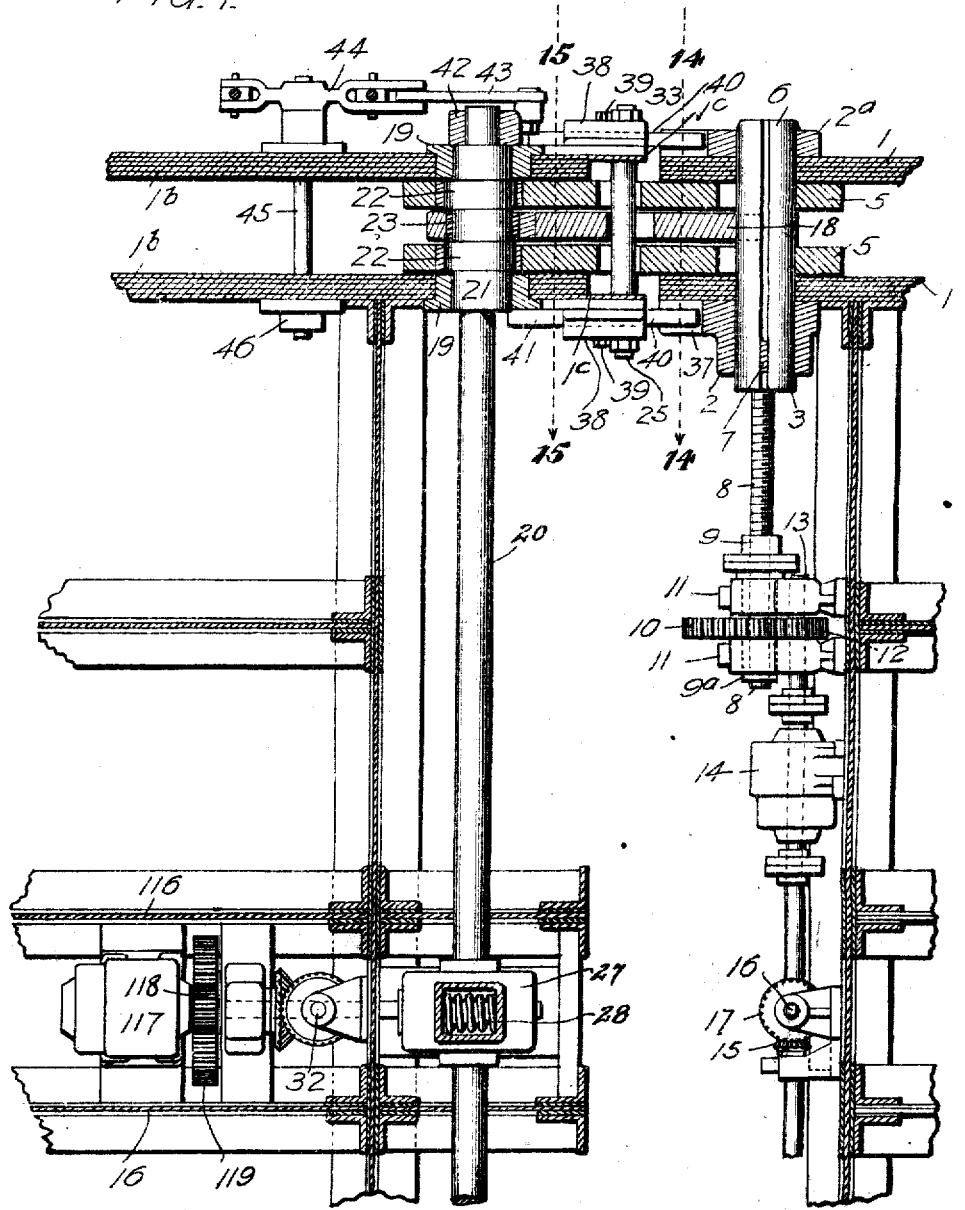

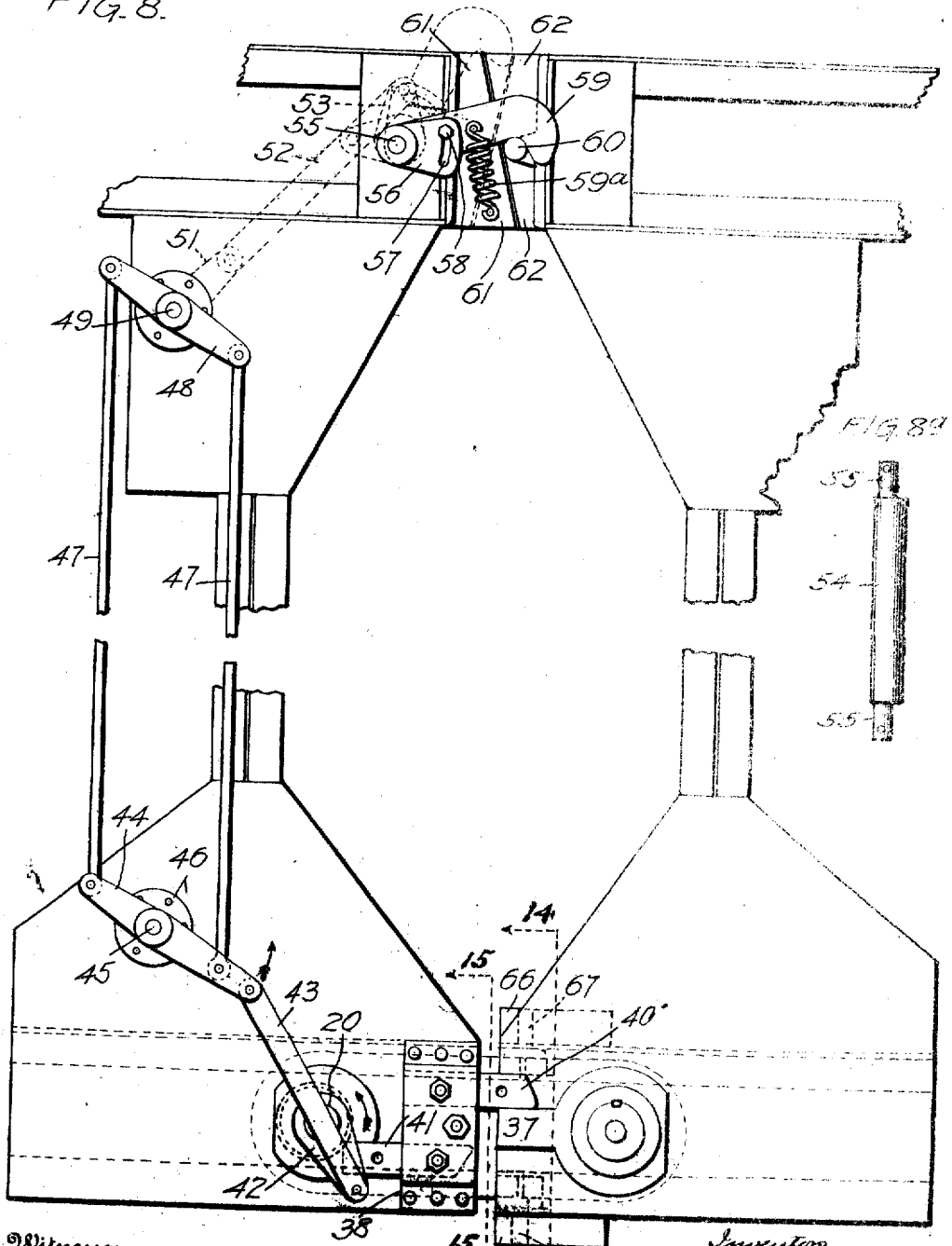

UNITED STATES PATENT OFFICE.

CHARLES H. MERCER, OF STEELTON, AND CHARLES H. WOEHLE, OF PAXTANG, PENNSYLVANIA.

BASCULE-BRIDGE.

1,241,237.  Specification of Letters Patent.  Patented Sept. 25, 1917.

Application filed November 15, 1915. Serial No. 61,516.

*To all whom it may concern:*

Be it known that we, CHARLES H. MERCER and CHARLES H. WOEHLE, both citizens of the United States, and residing, respectively, at Steelton and Paxtang, in the county of Dauphin and State of Pennsylvania, United States of America, have invented certain new and useful Improvements in Bascule-Bridges; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to a type of bridges known as "bascule" bridges, and particularly to a type of bascule bridge consisting of two leaves meeting at or near the middle of the channel and revolubly mounted or trunnioned at the sides of the channel to operate in a vertical plane and counterbalanced to so operate when clearing the channel or opening the bridge for any reason.

Our object is to provide for the expansion or contraction of the length of the whole bridge, while the leaves are locked together, by temperature conditions; also for positioning a leaf of the bridge by means whereby the whole leaf may be held, or moved endwise, as may be necessary to bring the channel end into desired and proper relation to the proximate end of the other leaf of the bridge, notwithstanding variation in the length of the leaves by reason of changes of temperature, or otherwise.

Also to provide for locking together the adjacent ends of the leaves by means of drawing together and locking the bottom chords or top chords of the leaves, or both, the mechanism therefor being preferably power-operated. Also to provide means whereby one leaf must be lifted before the other leaf can be raised, including means for changing the order of lifting.

Figure 1 is a side elevation of somewhat more than one-half of a bascule bridge embodying our invention.

Fig. 2 is a plan of the floor system in same, on plane I—I of Fig. 1.

Fig. 3 is a side elevation of a portion of the movable tower structure carrying trunnions on which the heel of the leaf pivots.

Fig. 4 is a horizontal section on line 4—4 of Fig. 3.

Fig. 5 is a plan of cylinders for moving the tower and piping.

Fig. 6 is an end elevation of the cylinders and pipe connections to pump.

Fig. 7 is a plan view, partly in section, of the locking mechanism for a pair of lower chords.

Fig. 8 is an elevation of the adjacent ends of side trusses, looking from the outside of the bridge and showing the ends of the top and bottom chords of the trusses and the mechanism for locking the top chords.

Fig. 8ª is a detail view of a shaft.

Figs. 9 and 10 are side and end elevations, partly in section, of the power mechanism for working the locking mechanism.

Fig. 11 is a plan of the top chord ends and locking devices.

Figs. 12 and 13 are detail views of the lower chord locking bars, and

Figs. 14 and 15 are sections on the lines 14—14 and 15—15 of Fig. 8.

Fig. 16 is a perspective view of one of the abutting upper chord castings.

We have illustrated our invention in connection with a single track bascule bridge, formed of two sections, called "leaves" tilting down to meet at the middle of the channel, thus forming a continuous span across the waterway. Each leaf is composed of two similar side trusses connected by transverse girders carrying four lines of stringers on which the track and its appurtenances are secured.

The shore end or heel of each side truss is provided with trunnion bearings 72 by which the leaf is pivoted and supported, above the shore pier, on a tower structure on which are also mounted the devices for counterbalancing the weight of the leaves, none of which forms part of this invention, (although necessarily shown in part in Fig. 1).

As the bridge has been designed, the dead-load of each half of the bridge is counter-weighted to equilibrium, so that, as in other bascule bridges, for dead load alone there are no stresses from one leaf to the other, At the center of the bridge, and for moving loads, the stresses in the trusses are as in a simple span of length equal to the distance between the trunnions on opposite piers by reason of the tension locks rigidly connecting the bottom chords and the compression joints in the top chords.

Thus when the heels of such bascule bridges are immovably pivoted, and the bridge is closed, with the leaves locked together, it is found that variations of temperature effect serious changes in the total length of the bridge, producing distortions and strains of a serious character. Also, when the bridge is opened and the leaf standing up for a considerable period of time during which a change of temperature occurs, and causes alteration of the total length of the bridge, there may be much difficulty in effecting the proper locking together of the leaves.

Hence, we have provided for having the left leaf with the tower structure to which it is pivoted, which also carries the counterbalancing devices, bodily movable by making the bottom of the tower structure adapted to rest on a bed of rollers that are supported on a suitable foundation plate or plates fixed to the masonry of the pier, whereby the variations of the total length, by temperature changes, are provided for by the free movement of the shore end with its pivots and mechanism for counterbalancing and raising.

Also to insure accurate positioning of the leaf at the time of closing, also while open, we place on the masonry and under the tower structure a pair of cylinders connected by piping to a pump adapted to produce liquid pressure, the piston of said cylinders being connected respectively to the lower gusset plates of the tower structure approximately in line with the respective side trusses, and we provide, in the bridge operator's house or cabin, a system of piping, with valves, adapted for applying the liquid pressure to either end of the cylinder simultaneously or separately, as may be desired. Thus, when the bridge is opened and the leaf stands up, wind pressure may suffice to move the leaf with its supporting structure, etc., and by closing the valves provided for that purpose, the liquid pressure will act equally on the opposite sides of the pistons, preventing any movement.

In Fig. 7 we have illustrated the power mechanism for locking the adjacent ends of the lower chords together, it being understood, of course, that in this type of bridge one of the leaves is longitudinally movable in order to compensate for expansion and contraction due to temperature differences, or for other purposes, and it therefore becomes necessary to provide mechanism for drawing the two leaves together. This mechanism we have illustrated as mounted between the side plates of the floor stringers or joists that carry the floor of the bridge. The leaves are locked together by means of pins, which pins are power-actuated and the power mechanism is also illustrated as located beneath the floor of the bridge.

In said Fig. 7, 1, 1, indicate the ends of the side plates of a side lower chord of the right hand leaf. Secured to the side chord are bearings 2 and 2ª and passing through this bearing and the plates 1, 1, is a locking pin 3, said locking pin also passing through elongated openings 4 in bars 5, which bars are shown in detail in Fig. 12, and will hereinafter be described in detail.

The pin 3 is provided with a slot 6 in which a feather 7 in the bearing 2 projects, said feather preventing the rotation of the pin. This pin is connected to a screw 8 that passes through a nut 9, which nut is on a sleeve 9ª and to which is rigidly connected a gear wheel 10. The sleeve 9ª is mounted in bearings 11. The gear wheel 10 is operated by a pinion 12 on a shaft 13 driven by an electric motor 14. The shaft 13 extends over to the other side chord of the bridge and has another pinion similar to the pinion 12, for operating like mechanism.

On the shaft 13 at the middle of the bridge is a bevel pinion 15, with which gears a bevel wheel 17 mounted on a vertical shaft 16 provided with a squared end for the application of a crank lever for hand operation when required.

From the above description it will be obvious that by operating the motor 14 in one or the other direction the pin 3 will be withdrawn from or inserted in the members 5. In retracted position the end of pin 3 rests within plates 1 and is supported mainly by bearing 2. As previously stated, the pin 3 passes through a pair of members 5, and in addition to this, the pin 3 is engaged by a member 18, shown in detail in Fig. 7. These members are carried by the left hand bridge leaf, the side plates 1ᵉ of one of the chords thereof being provided with bearings 19 in which is journaled a shaft 20 having enlarged concentric portions 21 to increase the bearing surface for said shaft, and also provided with eccentrics 22 and 23, the eccentric 22 being shifted 180° more or less, with respect to the eccentric 23. On these eccentrics are mounted the ends of members 5 and 18 forming one point of support therefor. The other point of support for these members is provided by a bolt or rod 25 passing through slots 26 in said members, Figs. 12 and 13.

The bolt or rod 25 is supported by the ends 1ᶜ of the outermost plates of the chord which project beyond the remainder of the side plates 1b. The shaft 20 extends to the other side of the bridge and operates mechanism which is a duplicate of that just described.

By rotating the shaft 20 after the insertion of the pin 3, the bars 5 are drawn to the left and placed under tension, while the bar 18, located between the two bars 5, is placed under compression by being thrust to the right, and conversely, before the pin 3 is withdrawn, the shaft 20 will be rotated in an opposite direction, simultaneously moving the bars 5 and 18 in opposite directions to release the pin.

As will be seen from Fig. 13, it is not necessary to have the pin 3 pass through the perforation in the end of the thrust member 18, and consequently we have simply provided a recess or seat 18a in the end of said member for the pin 3, as clearly shown in said Fig. 13.

The mechanism for operating the shaft 20 is preferably, but not necessarily, located between the side plates of one of the longitudinal stringers of the left-hand leaf, and, as illustrated in Figs. 7 and 9, is between the side plates 116 of the middle stringer. This mechanism consists of an electric motor 117 on whose rotor shaft is a pinion 118 meshing with a large gear wheel 119 on a shaft 120, supported in bearings 26 and 27. This shaft carries a worm 28 that drives a worm wheel 29 on shaft 20.

The shaft 120 also has secured thereto a miter gear 30 that is engaged by a miter gear 31 on a vertical shaft 32. The shaft 32 is supported in bearings 33 and 34, and is provided with a collar 35 and set screw 36, the collar contacting with the bearing 34, thereby providing means for holding shaft 32 in position, which, as shown, is provided with a squared upper end for the reception of a hand crank to manually operate the mechanism, when necessary or desirable.

In order to insure the lifting of the same leaf in advance of the other every time the bridge is opened, we provide means which comprises a stop or stops 37 on one leaf of the bridge, (preferably but not necessarily forming parts of the bearings 2 and 2a for the pin 3,) and on the other leaf of the bridge we provide a casting 38 secured to each side of the chord, and more clearly shown in Figs. 7, 8 and 15. In this casting, secured by means of set screws 39 are held stops or bars 40, 41, arranged to coöperate with the stop 37; one stop, 40, with the top, and the other, 41, with the bottom of stop 37. By projecting the stop 40 into the path of stop 37 the left hand leaf will have to be raised first. By releasing its set-screw 39 and shoving the stop 40 back into the casting 38, and projecting the stop 41 so as to engage the underside of the stop 37 it will be necessary to lift the right hand leaf first.

The bolt 25 also passes through these castings 38. If the leaf is of light structure one of the castings 38 and the pertaining stops may be omitted.

We have found that it is not only necessary to draw and lock the lower chords together, but it is also advisable to draw and lock the upper chords together, the upper chord locking mechanism being operated by suitable mechanism, preferably by the same mechanism that controls the drawing together and locking of the lower chord.

On the shaft 20 is a crank 42, which crank is connected by link 43 to one end of a two-armed lever 44 mounted on a short shaft 45 in bearings 46 secured to the left hand leaf of the bridge. This two-armed lever 44 is connected by rods 47 to a similar lever 48 keyed to a shaft 49 mounted in bearings 50. This shaft 49 carries a crank arm 51, Figs. 8 and 11. The crank arm is connected by a link 52 to a crank arm 53 keyed on a shaft 54. The shaft 54 has eccentric ends 55, Fig. 8a that project beyond the sides of the upper chord and have secured to their outer ends levers 56, which levers 56 have arcuate slots 57. Passing through the slots 57 are bolts 58 secured in hooks 59 that are loosely journaled on the eccentric extensions 55 of shaft 54. These hooks engage pins 60 that project laterally from the end of the upper chord of the right hand leaf.

The ends of the two upper chords are provided with interfitting abutting castings 61 and 62, respectively.

The upper chord locking mechanism is duplicated on the other side of the bridge.

The operation of the lower chord locking mechanism simultaneously operates the upper chord locking mechanism.

To unlock from the position shown in Fig. 8, the shaft 20 rotates in the direction of the arrow; levers 44 and 48 are similarly rotated from said shaft, and thereby cause lever 51 to rock to the left. The slotted end of lever 56 rises without affecting the hook 59, but during this period the eccentric portions 55 of the shaft 54 move the hook toward the right sufficiently to enable it to be readily lifted off its pin 60; then the end of slot 57 engages the bolt 58 on said hook and lifts it free of its pin.

In order to prevent any lagging of the hooks 59 a spring 59a is provided, to insure the falling of the hooks.

The reverse action takes place upon the locking movement. The hook 59 is allowed to drop on its pin 60 by the downward movement of lever 56 and the pin and slot connection 57, 58, and during the end portion of the downward movement of the lever 56 the hooks, after engaging the pins, are drawn to the left by the eccentric portion 55 of shaft 54.

The interfitting abutting castings 61 and 62, (one of which is shown in perspective in Fig. 16, being the casting 62 on the right hand leaf of the bridge and carrying the pins 60,) have reëntrant portions 63, the bottom of which, 64, is a continuation of the face of a projecting portion 65. The sides of the reëntrant portion 63 are inclined to receive the complementary projecting portion 65, which also has inclined sides, or in other words, is wedge-shaped. The castings also have inclined end faces making an angle with the face 64, the angular relation being more clearly shown in Fig. 8.

The wedge-shaped portions 63 and 65 will cause the ends of the two leaves to come together on center, should the end of one be slightly displaced laterally with respect to the other.

The lower chord is also provided with centering devices, comprising curved plates 66 projecting above and below the members or plates used in building up this chord.

On the bars 5, Figs. 12 and 14, are guide lugs 67, said lugs having sides curved oppositely to the plates 66. These guide lugs have depending flanges 67ª through which pass bolts 69 that connect the two bars 5 together.

In order to take care of the expansion and contraction due to temperature changes, the tower structure carrying one of the leaves of the bridge, at its pier end is mounted on rollers 68 and 68ª. The rollers 68 are placed between a foundation plate 69 supported on a pier, or masonry 70, and the base of tower structure 71 supporting the trunnion 72 on which the leaf turns.

The bridge leaves are opened and closed by any well known mechanism, from the operator's house 81, Fig. 2.

In order at times to compensate for temperature changes, or relieve binding or jamming of the locking mechanism, the whole left hand leaf of the bridge with the supporting tower structure is moved on the rollers by cylinders 82 and 82ª, one at each side behind the longitudinally movable bridge leaf.

These cylinders contain a piston 83, Fig. 4, which is directly connected by piston rod 84 to a pin 85 held in gusset plates 86 forming part of the tower structure, it being immaterial how or where the piston is connected to said structure so long as longitudinal motion can be imparted thereto by the action of a pressure medium or liquid on the piston.

The operative connections for these cylinders are shown in Figs. 5 and 6. The head ends of these cylinders are connected together by a pipe 87, and the back ends of the cylinders are also connected together by a pipe 88, Fig. 5, there being appropriate hand valves 89 to disconnect either cylinder from the fluid system for repairing the piston packing or for other purposes. These cylinders are connected to two main lines of pipe, 90 and 91, cross-connected so as to control the flow of motive fluid through the system.

The pipe 88 connecting the back ends of the cylinders 82 and 82ª is connected to the pipe 90, and the pipe 87 connecting the front ends of the cylinders is connected to pipe 91. Each of these pipe lines 90 and 91 is provided with a pressure gage, 92, 93, respectively, and a loaded relief valve, 94, 95, respectively. The relief valves are loaded to open under 500 pounds pressure, more or less, depending upon the size and weight of the truss to be moved. These relief valves discharge by pipes 96 and 97 into a reservoir 98 common to both of them. These relief valves take care of the difference of expansion between the metal of the piping and the liquid, due to temperature changes.

The reservoir connects by pipe 100 to three-way valve 101, which valve is connected by pipe 102 to pipe 90 and by pipe 103 to pipe 91.

Branch pipe 104 between pipes 100 and 90 and branch pipe 105 between pipes 101 and 91 contain check valves 106 and 107 to automatically supply liquid from reservoir 98 to piping and cylinders to compensate for contraction in volume of the liquid due to temperature changes.

There is a four-way valve 108 connected by pipe 109, to pipe 91 and by pipe 110 to pipe 90. This valve 108 also connects by pipe 111 to the discharge side of a hand or other pump 113, and by pipe 112 to the inlet side of said pump.

Pipe 112 is connected by pipe 114 to pipe 100, thereby affording a direct supply of liquid to the pump from the reservoir 98. Valves 115 serve to shut off the pump from the liquid system for repairs or other purposes.

When four-way valve 108 is closed and three-way valve 101 is open, the bridge is closed and locked, and open for traffic, and the liquid, preferably oil, is free to be displaced by the pistons 83 so that expansion and contraction of the span can take place. Before lifting the leaf for passage of river traffic, valves 101 and 108 must be closed.

Should there be any considerable change of temperature while the span is open it may become necessary for the operator to shift or move the movable left hand leaf.

Four-way valve 108 when turned one way connects pipes 110 and 111, and 109 and 112, so that oil may be pumped by the pump to the back ends of cylinders through pipes 88 and 90, the oil from the front ends of the cylinders passing through pipes 87, 91, 109, 112, either wholly or partially to the pump 113, as indicated in full arrows Fig. 6. When necessary, part of the oil may pass from pipes 112, 114, to reservoir 98. When valve 108 is reversed, the direction of flow of oil to the cylinders is reversed, as indicated in half arrows, Fig. 6.

Valves 89 may be used to move the piston on one side of the leaf only, when necessary to swing the leaf laterally; those adjacent one cylinder when closed, allow the other to operate. The pressure gages enable the operator to know what pressure is being exerted by the pump.

The coöperation of the individual elements constituting our improvements in bascule bridges has been described, but the general operation will be as follows:

First, close cylinder valves 101 and 108 to hold the bridge; the lower chord lock and the upper chord lock are then simultaneously operated to relieve the stress on the respective locking members and raise the upper chord hooks. The lower chord pin, being operated from a separate motor, is then withdrawn, and the leaves lifted in their proper order. Upon excessive temperature changes between the time of opening and closing the bridge, the left hand leaf may be shifted a fraction of an inch, more or less, by the fluid pressure to permit the leaves to properly lock at the middle of the span, when lowered.

We claim—

1. In a bascule bridge, the combination with two pivoted leaves and their counterweight structure, of mechanism for imparting endwise movement to the movable leaf of the bridge, and its counter-weighting structure.

2. In a bascule bridge, the combination with a pivoted leaf of the bridge having trusses and counterweight structure connected to said trusses; and rollers on which said structure and leaf are supported of means to simultaneously or separately move said trusses.

3. In a bascule bridge, the combination with a pivoted leaf of the bridge having trusses, means to pivotally support the trusses, and means to counterweight the leaf; of a fluid motor device for each truss and means to separately or simultaneously operate the motor devices to move the leaf or either truss either forward or backward.

4. In a bascule bridge, the combination with a pivoted leaf of the bridge having trusses, means to pivotally support said trusses at one end, and a counterbalance mechanism on said supporting means, of a hydraulic cylinder and piston adjacent each truss, the piston thereof directly connected to the supporting means, rollers on which said supporting means is mounted, and hydraulic mechanism for operating the pistons simultaneously or independently in either direction.

5. In a bascule bridge, the combination with a pivoted leaf having trusses, supporting means for the pivoted ends of the trusses, a parallelogram for the trusses having its members pivoted together, one of said members forming an element of the pertaining truss, and a counterweight connected to the parallelogram of means for bodily moving all of the aforesaid structure.

6. In a bascule bridge, the combination with one leaf thereof and its counterweight structures, of moving means therefor comprising a cylinder and piston connected to each truss of a leaf, an oil reservoir, a pump connected to said reservoir under all conditions and also connected to said cylinders, a valve to direct oil from the pump to one or the other end of said cylinders while connecting the opposite ends of said cylinders with said pump.

7. In a bascule bridge, the combination with a leaf thereof and its counterweight structure of moving means therefor comprising a cylinder and a piston connected to each side truss of the leaf, an oil reservoir, line pipes connecting both ends of said cylinders with said reservoir, check valves between said reservoir and line pipes to compensate for diminution in volume in said line pipes, relief valves between said pipes and reservoir, a pump connected to both line pipes and the reservoir, and a valve controlling the direction of fluid from the pump to either line pipe.

8. In a bascule bridge, the combination with a pivoted and laterally movable leaf, a counterweight for said leaf, a folding parallelogram between the trusses of said leaf and counterweight, of means to bodily move the leaf and counterweight longitudinally and to swing the leaf laterally.

9. In a bascule bridge, the combination with a pivoted leaf, means coöperating with said leaf to permit expansion and contraction of the bridge, of means to longitudinally move the trusses of said leaf independently or simultaneously on said expansion means.

In testimony that we claim the foregoing as our invention, we have signed our names in presence of two subscribing witnesses.

CHARLES H. MERCER.
CHARLES H. WOEHLE.

Witnesses:
 Geo. W. Parsons,
 A. F. Leeds.